(12) United States Patent
Brindza

(10) Patent No.: US 9,119,070 B2
(45) Date of Patent: Aug. 25, 2015

(54) METHOD AND SYSTEM FOR DETECTING UNAUTHORIZED WIRELESS DEVICES

(75) Inventor: Monica Juliet Brindza, Murphy, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 627 days.

(21) Appl. No.: 12/550,839

(22) Filed: Aug. 31, 2009

(65) Prior Publication Data

US 2011/0055928 A1    Mar. 3, 2011

(51) Int. Cl.
    H04W 12/08    (2009.01)
    H04L 9/32    (2006.01)
    H04L 29/06    (2006.01)
    H04W 12/12    (2009.01)
    H04W 88/08    (2009.01)

(52) U.S. Cl.
    CPC ............ H04W 12/08 (2013.01); H04L 63/10 (2013.01); H04W 12/12 (2013.01); H04W 88/08 (2013.01)

(58) Field of Classification Search
    CPC ..... H04W 12/08; H04W 12/12; H04W 88/08; H04L 63/10; H04L 61/2015; H04L 63/0272
    USPC ................. 726/26, 4; 455/410, 411
    See application file for complete search history.

(56) References Cited

U.S. PATENT DOCUMENTS

| | | | |
|---|---|---|---|
| 6,307,837 B1 * | 10/2001 | Ichikawa et al. | 370/230 |
| 6,393,484 B1 * | 5/2002 | Massarani | 709/227 |
| 7,342,906 B1 * | 3/2008 | Calhoun | 370/338 |
| 7,467,405 B2 * | 12/2008 | Cheng | 726/10 |
| 7,551,559 B1 * | 6/2009 | Jonnala et al. | 370/230 |
| 7,596,614 B2 * | 9/2009 | Saunderson et al. | 709/224 |
| 7,813,354 B1 * | 10/2010 | Norris | 370/401 |
| 2003/0123420 A1 * | 7/2003 | Sherlock | 370/338 |
| 2003/0200455 A1 * | 10/2003 | Wu | 713/200 |
| 2004/0049699 A1 * | 3/2004 | Griffith et al. | 713/201 |
| 2004/0054926 A1 * | 3/2004 | Ocepek et al. | 713/201 |
| 2004/0142744 A1 * | 7/2004 | Atkinson et al. | 463/29 |
| 2005/0254474 A1 * | 11/2005 | Iyer et al. | 370/338 |
| 2005/0254652 A1 * | 11/2005 | Engler et al. | 380/270 |
| 2006/0153122 A1 * | 7/2006 | Hinman et al. | 370/328 |
| 2006/0177063 A1 * | 8/2006 | Conway et al. | 380/270 |
| 2007/0058598 A1 * | 3/2007 | Ling | 370/338 |
| 2007/0150732 A1 * | 6/2007 | Suzuki et al. | 713/168 |
| 2007/0255837 A1 * | 11/2007 | Hassan et al. | 709/227 |
| 2007/0298720 A1 * | 12/2007 | Wolman et al. | 455/66.1 |
| 2008/0008143 A1 * | 1/2008 | Robertson et al. | 370/338 |
| 2008/0052763 A1 * | 2/2008 | Hum et al. | 726/3 |
| 2008/0101283 A1 * | 5/2008 | Calhoun et al. | 370/328 |
| 2008/0254792 A1 * | 10/2008 | Ch'ng | 455/435.1 |
| 2009/0271864 A1 * | 10/2009 | Dietrich et al. | 726/23 |
| 2010/0226347 A1 * | 9/2010 | Caldwell et al. | 370/338 |
| 2010/0281250 A1 * | 11/2010 | Moineau et al. | 713/151 |

OTHER PUBLICATIONS

Steve Riley, Mitigating the Threats of Rogue Machines—802.1X or IPsec?, Microsoft TechNet, http://technet.microsoft.com/library/cc512611.aspx (Aug. 9, 2005).*

* cited by examiner

Primary Examiner — Theodore Parsons

(57) ABSTRACT

An approach is provided for detecting unauthorized wireless devices in a network. A platform retrieves an identifier of a device from a log of devices connected to a network, determines whether the device is a wireless device by applying a plurality of criteria to the identifier, retrieving a list of wireless devices authorized to connect to the network if the device is determined to be a wireless device, and compares the identifier with the list to determine whether the device is authorized to connect to the network.

17 Claims, 6 Drawing Sheets

METHOD AND SYSTEM FOR DETECTING UNAUTHORIZED WIRELESS DEVICES

BACKGROUND INFORMATION

Wireless networking technologies offer users the convenience of mobility and ease of connection to a network. However, these same technologies can also introduce potential threats to maintaining the security of the network. For example, the installation of rogue (i.e., unauthorized) wireless access points in a network can pose a significant threat to network security in that the rogue access points can enable unauthorized access to the network beyond the network's intended perimeter. The unauthorized access can, in turn, compromise data or services provided in the network. Therefore, there is a need for an approach that provides for efficient and accurate detection of unauthorized wireless devices in a network.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred apparatus, method, and system for detecting unauthorized wireless devices are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to an unauthorized wireless device that is a wireless access point, it is contemplated that these embodiments have applicability to any device capable of communicating over a network using wireless technology including a personal computer (PC), mobile telephone, personal digital assistant (PDA), multimedia tablet, as well as other like technologies. In addition, it is contemplated that wireless technologies for connecting to a network includes, for instance, WiFi (e.g., IEEE 802.11a, 802.11b, 802.11g, 802.11n, etc.), Bluetooth, infrared communications, and the like.

Figure 1:
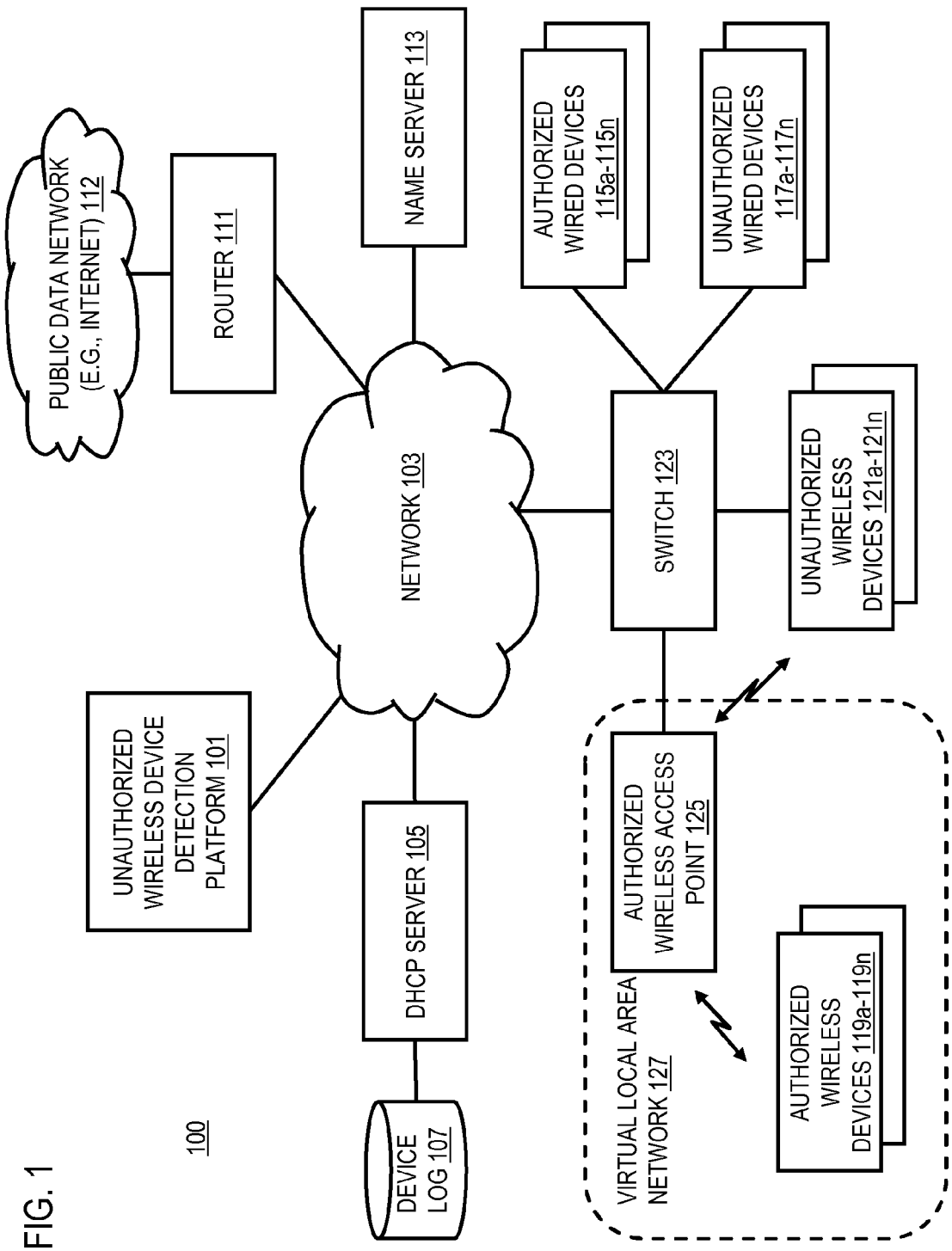
FIG. 1 is a diagram of a system capable of detecting unauthorized wireless devices, according to an exemplary embodiment.

FIG. 1 is a diagram of a system capable of detecting unauthorized wireless devices, according to an exemplary embodiment. For the purposes of illustration, a mechanism for detecting unauthorized wireless devices in a network is described with respect to a communication system 100 that includes an unauthorized wireless device detection platform 101 with connectivity to a network 103. In exemplary embodiments, the unauthorized wireless device detection platform 101 automatically searches network connection logs to identify wireless networked devices and then determines whether the identified wireless networked devices are authorized to connect to the network 103. As discussed previously, the identification of rogue or unauthorized wireless devices that are connected to the network 103 is important for maintaining the security of the network 103. These unauthorized wireless devices, for instance, can permit unauthorized users or to gain access to sensitive data or services within the network 103. In addition, unauthorized wireless devices can disrupt the routing of information within the network 103 and cause the network 103 to operate less efficiently. In some cases, unauthorized wireless devices may route network traffic to malicious servers or devices.

It is noted that the identification of unauthorized wireless devices is often difficult and problematic for organizations to implement. Traditionally, technology for identifying unauthorized wireless devices primarily depends on physical detection of wireless signals associated with the unauthorized wireless devices. However, this detection technology can be rife with false positive identifications, particularly in environments where the network 103 includes authorized wireless access points or where there is a plethora of interfering wireless networks. These false positives can obscure the discovery of actual unauthorized wireless devices.

To address these problems and mitigate the risk of unauthorized wireless devices on the network 103, the unauthorized wireless device detection platform 101 runs, for instance, automated detection scripts on network connection logs to identify unauthorized wireless devices by applying predetermined identification criteria. By way of example, the detection platform 101 retrieves an identifier (e.g., a media access control (MAC) address) associated with a suspect wireless device from the network connection log to determine whether the suspect device is a wireless device. If the identifier meets certain criteria for identification as a wireless device, the detection platform 101 determines whether the device is authorized to connect to the network 103. For example, the criteria may rely on analyzing the retrieved device identifier to determine whether it contains any information associated with known wireless devices. If the device is not authorized to access the network 103, the detection platform 101 identifies the device as an unauthorized wireless device. In certain embodiments, the detection platform 101 uses the identification of the unauthorized wireless device to generate authorization information (e.g., a list of unauthorized wireless devices) and/or to deny access to the network 103 by the unauthorized wireless device. Because the detection platform 101 operates without needing to perform physical detection of the unauthorized wireless signal, the platform 101 is not as susceptible to false positives from wireless interference as detection mechanisms using primarily signal detection. Accordingly, the detection platform 101 can operate effectively in network environments including an authorized wireless infrastructure as well as in environments without an authorized wireless infrastructure. Moreover, the approach, in certain embodiments, described herein eliminates or reduces the cost of having to deploy wireless monitors throughout the network 103 to monitor for signals emanating from unauthorized wireless devices.

As shown in FIG. 1, the detection platform 101 has connectivity to a network address (e.g., dynamic host configuration protocol (DHCP)) server 105 for obtaining network connection logs. As a device connects to the network 103, the device requests network configuration information from the network address server 105. In one embodiment, the network configuration information includes, for instance, a network address (e.g., an Internet Protocol (IP) address or an internal data network (IDN) address), default gateway, domain name, domain name system (DNS) servers, etc. When the DHCP server 105 provides the network configuration information to a connecting device, the server 105 also maintains a network connection log (e.g., a DHCP table) to record information on each device that has connected to the network 103. The network connection log contains, for instance, a listing of each connected device's network address, name, DHCP lease expiration time, unique identifier (e.g., MAC address), and description. In exemplary embodiments, the detection platform 101 retrieves, from the network connection log, a unique identifier (e.g., the MAC address) corresponding to each connected network device to facilitate detection of unauthorized wireless devices. In the example of FIG. 1, the DHCP server 105 stores the network connection log in a device log database 107.

The network 103 also includes connectivity to a name server 109 (e.g., a DNS server) for resolving domain names into IP addresses for devices connected to the network 103. In some cases, as a wireless access point connects to the network 103, the access point identifies itself to the name server 109 so that the wireless access point can direct domain name resolution requests received from connected devices to the name server 109. As part of the identification process, the access point transmits identification information including, e.g., its MAC address and name, to the name server 109. In one embodiment, the unauthorized wireless device detection platform 101 consults the name server 109 to determine whether an unauthorized wireless device has identified itself to the name server 109. The detection of a device name associated with an unauthorized wireless device is an indication that the authorized wireless device has connected to the network 103 and is potentially allowing connections from other unauthorized devices. Although the name server 109 is shown in FIG. 1 as a separate component, it is contemplated that the name server 109 may be incorporated within another component of the network such as the router 111. The router 111, for instance, provides connectivity from the network 103 to a public data network (e.g., the global internet, Internet) 112.

It is contemplated that many different types of devices (e.g., computers; PDAs; mobile telephones; and networking equipment such as access points, routers, switches, and the like) may connect to the network 103. In the system 100, each connected device may be categorized into, for instance, one of four groups depending on (1) the type of connectivity the device has to the network 103 (e.g., wired or wireless) and/or can provide to other devices, and (2) whether the device is authorized to access the network 103. As used herein, the term "authorized" means that a device has approval to connect to the network 103 or is otherwise granted permission to connect to the network 103. Authorization to access the network 103 may, for instance, be granted explicitly (e.g., the operator of the network 103 provides a grant to the specific device to access the network) or implicitly (e.g., the operator of the network 103 does not deny a specific device access to the network 103). Table 1 below lists the four general categories of devices under the described device classification scheme.

TABLE 1

|  | Authorized | Unauthorized |
| --- | --- | --- |
| Wired | Authorized wired devices 115a-115n | Unauthorized wired devices 117a-117n |
| Wireless | Authorized wireless devices 119a-119n | Unauthorized wireless devices 121a-121n |

By way of example, wired devices (e.g., authorized wired devices 115a-115a and unauthorized wired devices 117a-117n) are connected to the network 103 via, for instance, a switch 123. The switch 123 provides a physical connection (e.g., an RJ45 connection) to the network 103 and routes data between the network 103 and connected devices. In one embodiment, the wired devices do not provide any functionality for wireless devices to gain access to the network 103. In other words, wired devices have direct physical (e.g., wired) connectivity to the network 103, but do not act as wireless access points. It is noted that wired connections are generally more secure than wireless connections because wired connections generally require connected devices to be located within the physical perimeter of the network 103 in order to be connected to an available physical port.

In contrast, wireless devices either provide wireless connectivity (e.g., via WiFi, Bluetooth) to the network 103 (e.g., authorized wireless access point 125), or have a wireless connection to the network 103 via, for instance, the authorized wireless access point 125 or other equivalent wireless access point. Because wireless connections are limited only by the range of the serving wireless access point, wireless connections can increase potential security risks by extending the wireless connectivity beyond the perimeter of the physical network 103. In one embodiment, the authorized wireless access point 125 has connectivity to the network 103 via a physical connection to the switch 123. In addition, the authorized wireless access point 125 and authorized wireless devices 119a-119n that are connected via the wireless access point 125 can operate within a virtual local area network (VLAN) 127. The VLAN 127, for instance, represents a group of wireless devices that are segmented logically into one broadcast domain. In certain embodiments, the wireless devices within the VLAN 127 need not be located within the same physical location. Operating within the VLAN 127 enables the network 103 to provide a more secure wireless infrastructure, because the devices within the VLAN 127 do not have direct connections to the network 103.

The use of the VLAN 127 also enables the network 103 to more easily identify the unauthorized wireless devices 121a-121n. More specifically, according to the approach described herein, the system 100 identifies any identified wireless device (e.g., connected either directly to the switch 123, the authorized wireless access point 125, or an unauthorized wireless access point (not shown)) as unauthorized if the wireless device is not operating within the VLAN 127. As shown in FIG. 1, the unauthorized wireless devices 121a-121n may be connected to the network 103 either via the switch 123 or the authorized wireless access point 125. It is also anticipated that one or more of the unauthorized wireless devices 121a-121n may have connectivity to the network 103 via another unauthorized wireless device 121a (e.g., when the unauthorized wireless device 121a is a wireless access point). The aim of the system 100 is to identify any unauthorized wireless device 121a on the network 103 by applying predetermined identification criteria to network connection logs obtained from the wired side (e.g., components and devices outside of the VLAN 127) of the network 103. In this way, the system 100 need not employ wireless signal detection mechanisms to identify wireless devices on the network 103.

By way of example, the components and devices of the network 103 communicate with each other using well known, new or still developing protocols. In this context, a protocol includes a set of rules defining how the network nodes within the network 103 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2:
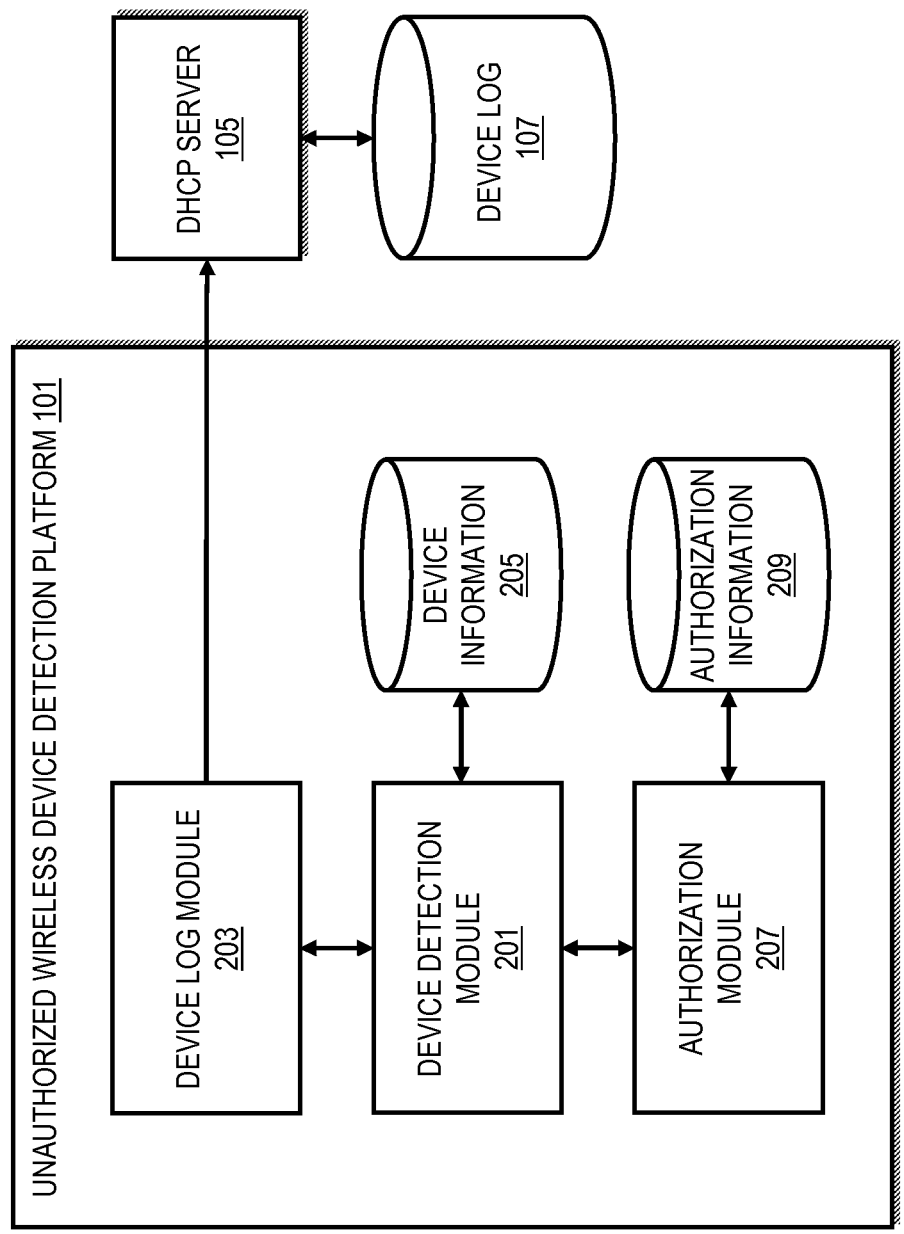
FIG. 2 is a diagram of the components of an unauthorized wireless device detection platform, according to an exemplary embodiment.

FIG. 2 is a diagram of the components of an unauthorized wireless device detection platform, according to an exemplary embodiment. By way of example, the unauthorized wireless device detection platform 101 includes one or more components for detecting unauthorized wireless devices. It is contemplated that the functions of these components may be combined in one or more components or performed by other components of equivalent functionality. In one embodiment, the detection platform 101 includes a device detection module 201 that provides the control logic for detecting wireless devices connected to the network 103 and determining whether the connected wireless devices are authorized to access the network 103. The device detection module, for instance, interacts with the device log module 203 to retrieve one or more identifiers from a network connection log (e.g., DHCP table) associated with the devices that are connected to the network 103. In one embodiment, the identifier is a MAC address corresponding to each device connected to the network 103. The MAC address is a unique serial number assigned to the network adapter of each network-enabled device that can be used in the system 100 to identify a network device (see the discussion with respect to FIG. 3 for additional information on the MAC address). To retrieve the one or more identifiers, the device log module 203, for instance, communicates with the DHCP server 105 to access the network connection log stored in the device log database 107.

After retrieving the identifiers, the device detection module 201 analyzes the identifiers to determine whether any of the identifiers is associated with a wireless device. This analysis includes determining whether the identifiers meet any of a set of predetermined criteria associated with wireless devices. More specifically, the device detection module 201 parses the retrieved identifiers (e.g., MAC addresses) for information that indicates the corresponding device is a wireless device. In one embodiment, the criteria and information are stored in the device information database 205 and include (1) determining whether the identifier corresponds to a known wireless device model name (e.g., Linksys® WRT400N wireless access point, Netgear® WNB2100 wireless access point, D-Link® DIR-655 wireless access point, etc.) and whether the device model name is detected at the name server 113 (e.g., a DNS server); (2) determining whether the identifier corresponds to a mobile telephone with wireless networking capability; (3) determining whether the identifier corresponds to a wireless network interface controller associated with a known network device; and (4) determining whether the identifier corresponds to a wireless access point that has been designated as an interfering access point (e.g. a neighboring wireless access point that is not in the network 103 but overlaps on one or more radio channels with an access point that is in the network 103). The application of the criteria may result in the creation of a list of wireless devices detected in the network 103.

The device detection module then determines which of the identified wireless devices are authorized to access the network 103. Any device not identified as authorized is considered to be unauthorized to connect to or access the network 103. In one embodiment, the system 100 retrieves a list of wireless devices that are authorized to connect to the network 103 from the VLAN 127. As discussed previously, the network 103 permits authorized wireless devices 119a-119n to access the network 103 only through the VLAN 127. A wireless device connecting to or accessing the network 103 through any other means than the VLAN 127 can be considered an unauthorized device. It is contemplated that the network 103 may use any means to designate whether a device is authorized to access the network 103. For example, the network 103 may maintain a list of authorized wireless devices 119a-119n. In this case, a wireless device can be authorized to access the network 103 by adding and identifier of the device to the list. In another example, authorized wireless devices 119a-119n may be provided with authentication keys, security certificates, and the like to authenticate and authorize themselves on the network 103. Regardless of how the device detection module 201 obtains the list of authorized wireless devices 119a-119n, the device detection module 201 compares the identifiers of the connected devices it has identified as wireless devices against the list of authorized wireless devices 119a-119n to determine which of the identified wireless devices are unauthorized to connect to or access the network 103.

The device detection module 201 then interacts with the authorization module 207 to add the identified unauthorized wireless device to a list of unauthorized wireless devices 121a-121n. In addition or alternatively, the authorization module 207 may deny access to the network 103 by any device identified as an unauthorized wireless device 121a. The list of unauthorized wireless devices 121a-121n and/or the list of devices denied access to the network 103 can be stored in the authorization information database 209.

Figure 3:
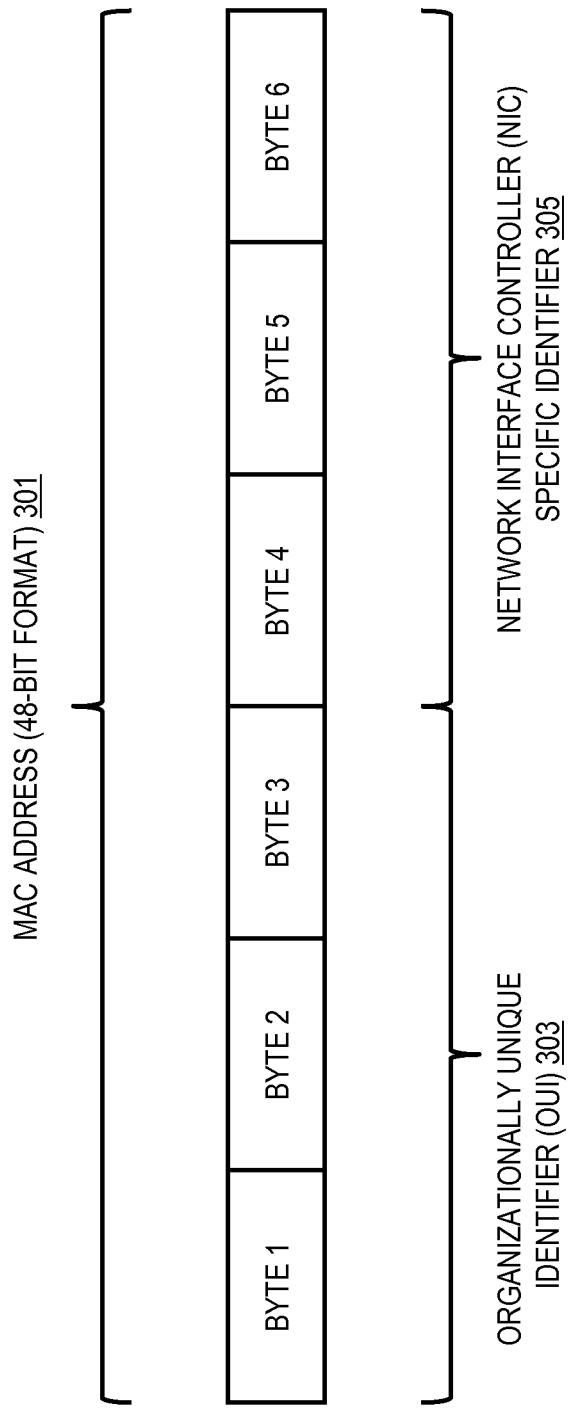
FIG. 3 is a diagram of a format of an exemplary Media Access Control (MAC) address, according to an exemplary embodiment.

FIG. 3 is a diagram of a format of an exemplary Media Access Control (MAC) address, according to an exemplary embodiment. In one embodiment, the system 100 uses a 48-bit MAC address (defined in "802-IEEE Standard for Local and Metropolitan Area Networks: Overview and Architecture," IEEE Std 802-2001®, incorporated herein by reference in its entirety) as the identifier for devices connected to the network 103. The 48-bit MAC address format allows for $2^{48}$ (281,474,976,710,656) unique addresses and is intended to be unique to each network interface controller (NIC) associated with a device. As shown in FIG. 3, the 48-bit MAC address 301 is organized into six bytes of 8 bits each. Each byte is also known as an octet and can be represented as six groups of hexadecimal digits separated by a dash (e.g., 00-00-00-00-00-00). The first three bytes (e.g., 24 bits) of the MAC address represents an organizationally unique identifier (OUI) 303. The OUI 303, for instance, identifies the manufacturer or vendor of the NIC. The remaining 3 bytes (e.g., 24 bits) represent a NIC-specific identifier 305.

In certain embodiments, the system 100 extracts the OUI 303 from the MAC address 301 as part of the process of applying criteria to the MAC address 301 to identify whether a particular MAC address 301 is associated with a wireless device. For example, the OUI 303 can be used to identify the manufacturer which, in turn, can identify the particular device type.

Figure 4:
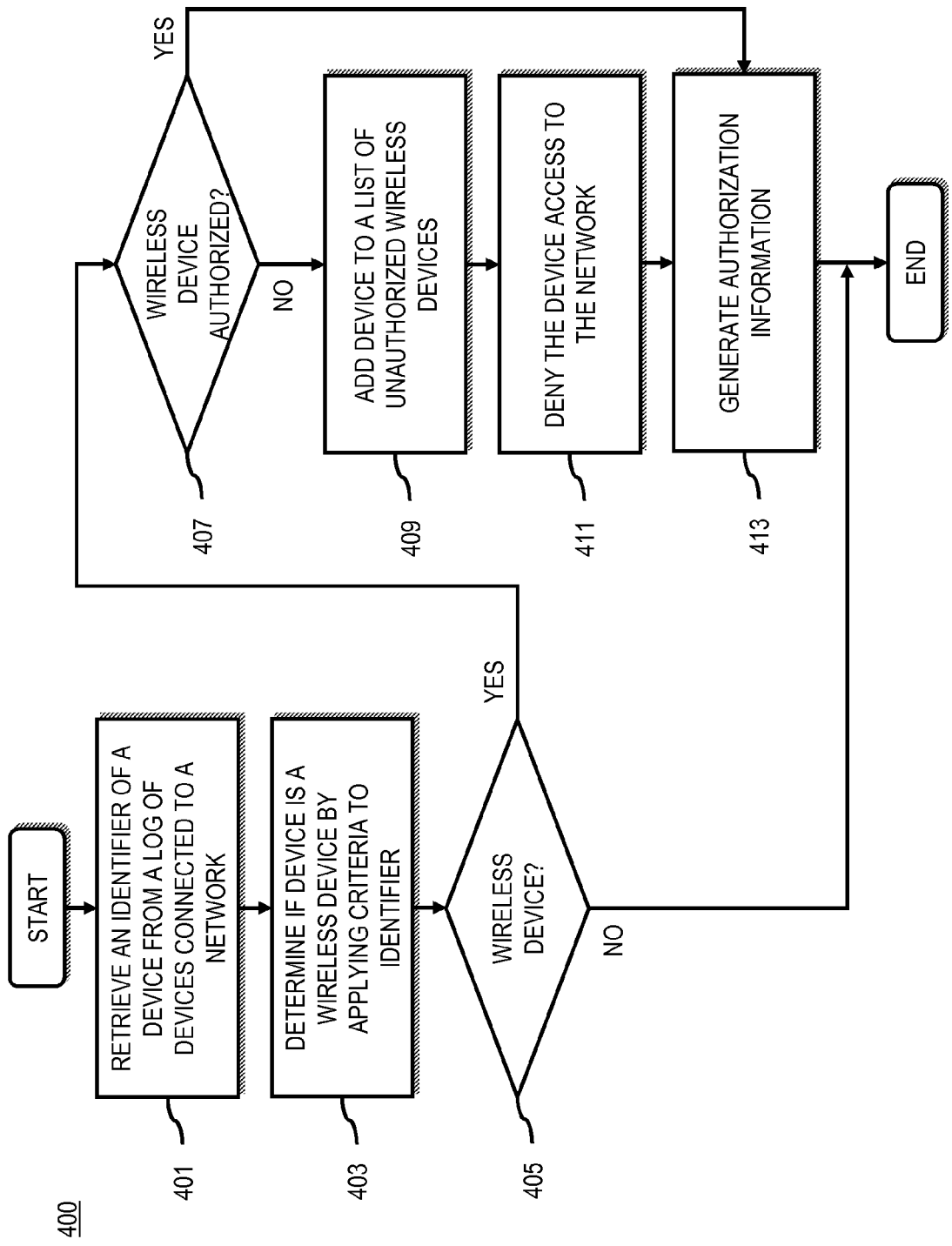
FIG. 4 is a flowchart of a process for detecting unauthorized wireless devices, according to an exemplary embodiment.

FIG. 4 is a flowchart of a process for detecting unauthorized wireless devices, according to an exemplary embodiment. In one embodiment, the unauthorized wireless device detection platform 101 performs the process 400 of FIG. 4. In step 401, the detection platform 101 retrieves one or more identifiers corresponding to respectively to one or more devices from a log of devices connected to the network 103 (e.g., DHCP table). In this example, the detection platform 101 may retrieve the identifiers periodically (e.g., every 10 minutes, every 30 minutes, etc.) or on request from the network 103. Also, it is anticipated that the detection platform 101 may retrieve the network connection log from one DHCP server 105 or multiple DHCP servers in the network 103. The detection platform 101 then determines if any of the retrieved identifiers are wireless devices by applying a predetermined set of criteria to the identifiers (step 403). It is contemplated that the detection platform 101 may apply any criteria capable of distinguishing a wireless device from other network devices. Examples of criteria that may be applied are discussed with respect to FIG. 5 below.

If the detection platform 101 determines that one or more of the retrieved identifiers meet the criteria for classification as a wireless device (step 405), the detection platform 101 next determines whether any of the identified wireless devices is authorized to connect to or access the network 103 (step 407). By way of example, the detection platform 101 determines whether a wireless device is authorized to access the network 103 by retrieving a list of authorized wireless devices. In one embodiment, this list of authorized wireless devices is obtained from the VLAN 127. If the identified wireless device is not authorized to connect to the network 103, the detection platform 101, for instance, add the identified wireless device to a list of unauthorized wireless devices 121a-121n (step 409). Optionally or alternatively, the detection platform 101 may also deny the identified wireless device access to the network 103 (step 411). For example, denying access includes not providing network configuration information, blocking network traffic to the identified wireless device, physically removing the identified wireless device from the network, and the like. In certain embodiments, the detection platform 101 may also use any information obtained during the detection process to generate authorization information related to devices connected to the network 103 (step 413). More specifically, the detection platform 101 may use information on connected devices and any identified characteristics (e.g., connection type, NIC manufacturer, etc.) to generate a more complete view of the network topology. This network topology includes, for instance, identification of which devices are authorized and not authorized to use the network.

Figure 5:
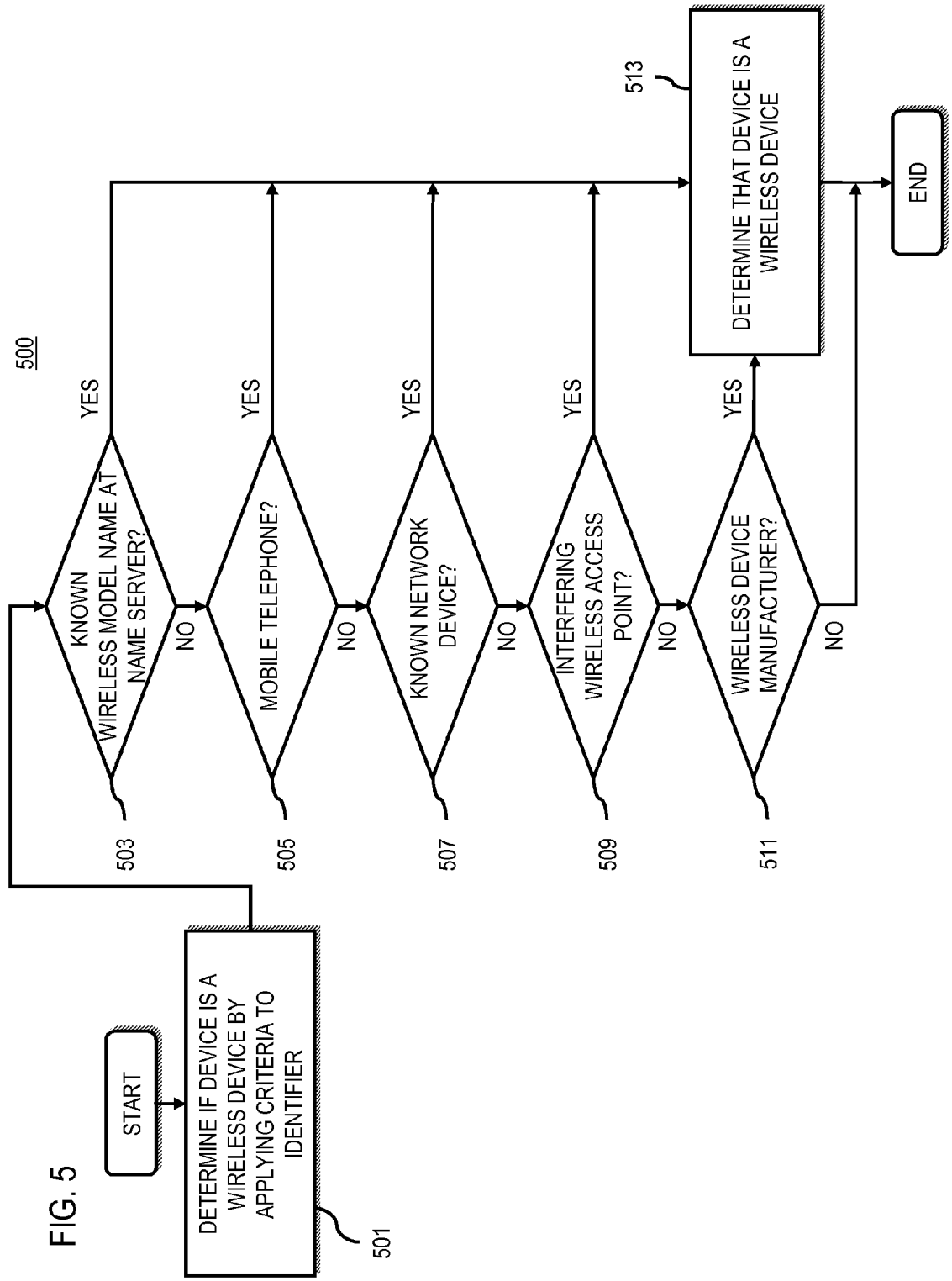
FIG. 5 is a flowchart of a process for applying criteria for determining whether a device is a wireless device, according to an exemplary embodiment.
Figure 6:
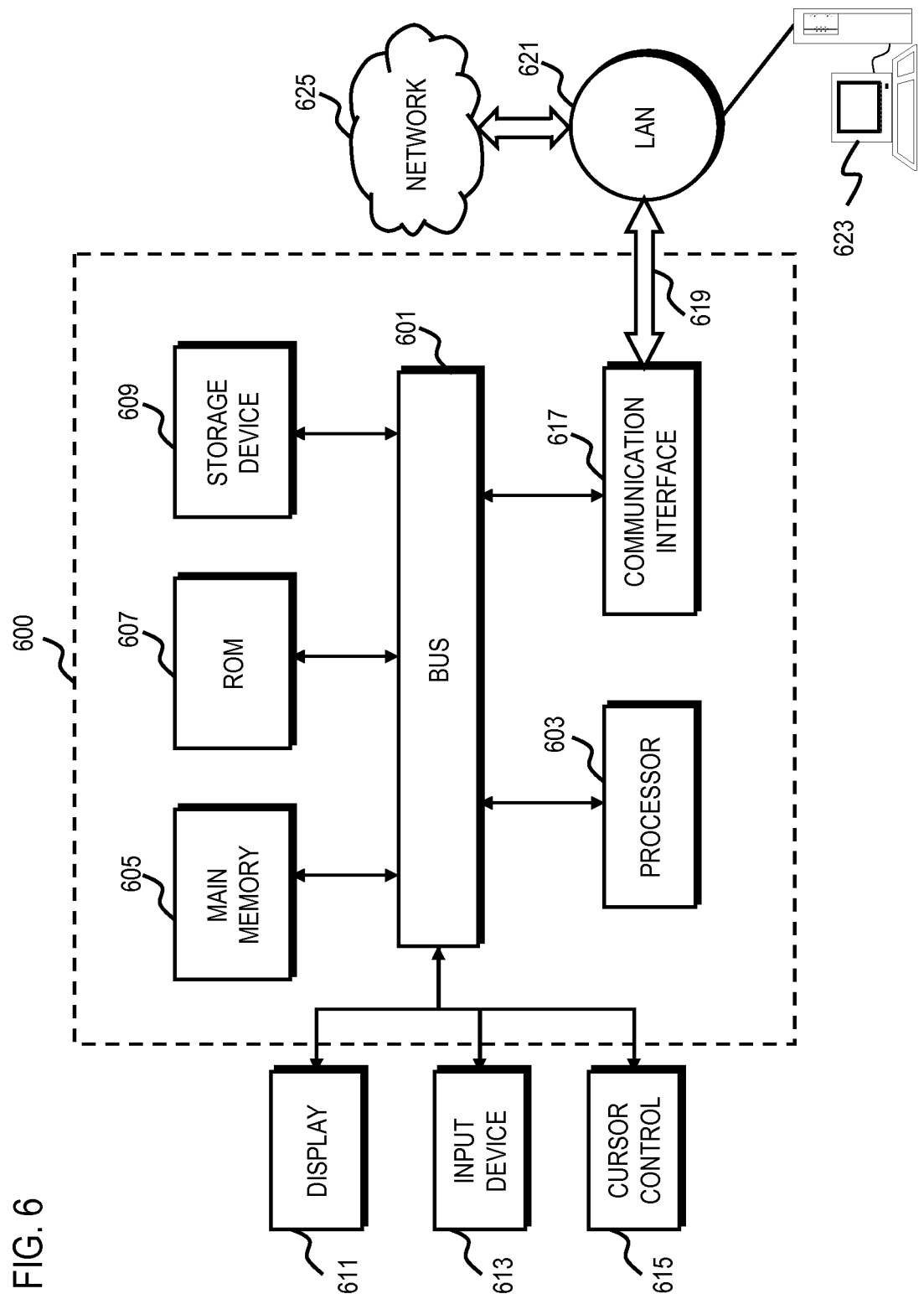
FIG. 6 is a diagram of a computer system that can be used to implement various exemplary embodiments.

FIG. 5 is a flowchart of a process for applying criteria for determining whether a device is a wireless device, according to an exemplary embodiment. In one embodiment, the unauthorized wireless detection platform 101 performs the process 500 of FIG. 5. As described with respect to FIG. 4 above, the detection platform 101 determines whether a device that is connected to the network 103 (e.g., as identified from the DHCP table) is authorized to access the network 103 by applying a predetermined set of criteria (step 501). In step 503, the detection platform 101 determines whether the identifier associated with a detected device corresponds to a known wireless device model name and then whether the device model name is detected at the name server 113. As discussed previously, if the identified device is a wireless access point, the device will register with the name server 113 to be able to resolve DNS requests. As a result, the name of the unauthorized access point may be captured by the name server 113 during the registration process. It is noted that in many cases wireless access points default to a vendor-provided name unless the user specifically changes the name. To take advantage of this observation, the detection platform 101 can search for common access point names (e.g., Linksys®, Netgear®, D-link®, etc.) at the name server 113. If the identifier associated with the identified device corresponds to one of the default wireless access point names and the name also appears at the name server 113, the detection platform 101 identifies the device as a wireless device (e.g., a wireless access point).

In step 505, the detection platform 101 applies a criterion to determine whether the retrieved identifier corresponds to a mobile telephone with wireless networking capability. Many modern mobile telephones (e.g., smartphones) have built-in wireless networking (e.g., WiFi, Bluetooth). In a default configuration mode, these mobile telephones may automatically connect to any available unsecured wireless access point. If an identifier associated a mobile phone appears in the network connection log (e.g., DHCP table), the detection platform 101 determines that there is an unsecured and likely unauthorized wireless access point operating within the network 103 to allow the network-enabled smartphone to connect to the network 103. To make a determination of whether the retrieved identifier corresponds to a smartphone, the detection platform, for instance, extracts the OUI from the identifier (e.g., MAC address) and matches the OUI against a list of smartphone vendors. If the OUI matches one of the smartphone vendors, the detection platform 101 determines that the retrieved identifier corresponds to a smartphone with networking capabilities (e.g., a wireless device). In a network with no wireless infrastructure or wireless infrastructure implemented within the VLAN 127, an identifier corresponding to a wireless device should not appear in the network connection log unless the wireless device is unauthorized. Therefore, in such a network (e.g., in the network 103), any appearance of a device identifier (e.g., MAC address) corresponding to a wireless device indicates the presence of an unauthorized and/or unsecure wireless access point in the network 103.

In step 507, the detection platform applies a criterion to determine whether the retrieved identifier corresponds to a wireless network interface controller associated with a known network device. In one embodiment, the detection platform 101 maintains a list of network assets (e.g., network components and devices) that are known to the network 103, owned by the operator of the network 103, or otherwise authorized to access the network 103. By way of example, the list of network assets includes at least the identifiers (e.g., MAC addresses) corresponding to the network interface cards corresponding to the respective assets. The list is stored in, for instance, the device information database 205. It is contemplated that some of these network assets have wireless networking capability (e.g., a notebook computer with both wired and wireless network interface cards). In normal operations, the network asset either is connected to the network through a wired connection or through a wireless connection within the VLAN 127. Accordingly, an identifier (e.g., MAC address) associated with the wireless network interface card of the network asset should not appear in any of the network connection logs outside of the VLAN 127. The appearance of such an identifier is an indication that there is an unauthorized wireless access point on the network 103 that is providing wireless connectivity to the network asset. In one embodiment, to apply the criterion, the detection platform 101 compares the retrieved identifier against the list of identifiers of the wireless network interface cards of known network assets. If there is a match, the detection platform 101 determines that the retrieved identifier corresponds to a wireless device.

In step 509, the detection platform 101 applies a criterion to determine whether the retrieved identifier corresponds to a detected interfering wireless access point. In one embodiment, the detection platform 101 monitors the surrounding wireless environment of the facility of network 103 to identify wireless access point signals. For example, the detection platform 101 logs the basic service set identifier (BSSID) of the wireless access point (e.g., the BSSID is the MAC address of a wireless access point). The identifiers associated with wireless access points are, for instance, stored in the device information database 205. In the example embodiment, the detection platform 101 compares the retrieved BSSID identifier against the device log 107. By way of example, the detection platform 101 may declare a match if all six bytes of the retrieved identifier match all six bytes of an identifier in device log 107. Alternatively, the detection platform 101 may also declare a match if only the first five bytes of the retrieved identifier match the first five bytes in device log 107. Matching only the first five bytes enables the detection platform 101 to discover additional access points that are similar to the neighboring wireless access point. Detecting the first 5 or all 6 bytes of a BSSID identifier in device log 107 indicates that an unauthorized wireless access point has connected to the network 103. Therefore, if the retrieved identifier matches any of the identifiers in device log 107, the detection platform 101 determines that the retrieved identifier corresponds to a wireless device connected to network 103.

In step 511, the detection platform 101 applies a criterion to determine whether the retrieved identifier corresponds to a wireless device manufacturer. As discussed previously, the MAC address includes an OUI that represents the manufacturer or vendor of the NIC to which the MAC address corresponds. Accordingly, in one embodiment, the detection platform 101 maintains a list OUIs corresponding to wireless device manufacturers that is stored, for instance, in the device information database 205. The appearance of an identifier associated with a wireless device manufacturer in a network connection log (e.g., DHCP table) is an indication that the device corresponding to the identifier has gained access to the network 103 through a wireless connection. For example, to apply the criterion, the detection platform 101 extracts the OUI from the retrieved identifier (e.g., MAC address) and matches the OUI against the list of OUIs of wireless device manufacturers. If there is a match, the detection platform 101 determines that the retrieved identifier corresponds to a wireless device (step 513).

Although FIG. 5 depicts the detection platform 101 applying the described criteria in sequence, it is contemplated that the detection platform 101 may apply the criteria individually or in any combination. It is also contemplated that the detection platform 101 may apply any other criteria capable of distinguishing an identifier associated with a wireless device from an identifier associated with a non-wireless device.

The processes described herein for detecting unauthorized wireless devices may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

FIG. 8 illustrates computing hardware (e.g., computer system) upon which an embodiment according to the invention can be implemented. The computer system 800 includes a bus 801 or other communication mechanism for communicating information and a processor 803 coupled to the bus 801 for processing information. The computer system 800 also includes main memory 805, such as random access memory (RAM) or other dynamic storage device, coupled to the bus 801 for storing information and instructions to be executed by the processor 803. Main memory 805 also can be used for storing temporary variables or other intermediate information during execution of instructions by the processor 803. The computer system 800 may further include a read only memory (ROM) 807 or other static storage device coupled to the bus 801 for storing static information and instructions for the processor 803. A storage device 809, such as a magnetic disk or optical disk, is coupled to the bus 801 for persistently storing information and instructions.

The computer system 800 may be coupled via the bus 801 to a display 811, such as a cathode ray tube (CRT), liquid crystal display, active matrix display, or plasma display, for displaying information to a computer user. An input device 813, such as a keyboard including alphanumeric and other keys, is coupled to the bus 801 for communicating information and command selections to the processor 803. Another type of user input device is a cursor control 815, such as a mouse, a trackball, or cursor direction keys, for communicating direction information and command selections to the processor 803 and for controlling cursor movement on the display 811.

According to an embodiment of the invention, the processes described herein are performed by the computer system 800, in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multi-processing arrangement may also be employed to execute the instructions contained in main memory 805. In alternative embodiments, hard-wired circuitry may be used in place of or in combination with software instructions to implement the embodiment of the invention. Thus, embodiments of the invention are not limited to any specific combination of hardware circuitry and software.

The computer system 800 also includes a communication interface 817 coupled to bus 801. The communication interface 817 provides a two-way data communication coupling to a network link 819 connected to a local network 821. For example, the communication interface 817 may be a digital subscriber line (DSL) card or modem, an integrated services digital network (ISDN) card, a cable modem, a telephone modem, or any other communication interface to provide a data communication connection to a corresponding type of communication line. As another example, communication interface 817 may be a local area network (LAN) card (e.g. for Ethernet™ or an Asynchronous Transfer Model (ATM) network) to provide a data communication connection to a compatible LAN. Wireless links can also be implemented. In any such implementation, communication interface 817 sends and receives electrical, electromagnetic, or optical signals that carry digital data streams representing various types of information. Further, the communication interface 817 can include peripheral interface devices, such as a Universal Serial Bus (USB) interface, a PCMCIA (Personal Computer Memory Card International Association) interface, etc. Although a single communication interface 817 is depicted in FIG. 8, multiple communication interfaces can also be employed.

The network link 819 typically provides data communication through one or more networks to other data devices. For example, the network link 819 may provide a connection through local network 821 to a host computer 823, which has connectivity to a network 825 (e.g. a wide area network (WAN) or the global packet data communication network now commonly referred to as the "Internet") or to data equipment operated by a service provider. The local network 821 and the network 825 both use electrical, electromagnetic, or optical signals to convey information and instructions. The signals through the various networks and the signals on the network link 819 and through the communication interface 817, which communicate digital data with the computer system 800, are exemplary forms of carrier waves bearing the information and instructions.

The computer system 800 can send messages and receive data, including program code, through the network(s), the network link 819, and the communication interface 817. In the Internet example, a server (not shown) might transmit requested code belonging to an application program for implementing an embodiment of the invention through the network 825, the local network 821 and the communication interface 817. The processor 803 may execute the transmitted code while being received and/or store the code in the storage device 809, or other non-volatile storage for later execution. In this manner, the computer system 800 may obtain application code in the form of a carrier wave.

The term "computer-readable medium" as used herein refers to any medium that participates in providing instructions to the processor 803 for execution. Such a medium may take many forms, including but not limited to non-volatile media, volatile media, and transmission media. Non-volatile media include, for example, optical or magnetic disks, such as the storage device 809. Volatile media include dynamic memory, such as main memory 805. Transmission media include coaxial cables, copper wire and fiber optics, including the wires that comprise the bus 801. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
retrieving from one or more storage devices identifiers of a plurality of devices connected to a network from a network connection log of devices connected to the network;
determining with a processor whether each of the plurality of devices connected to the network is a wireless device by applying a plurality of criteria to each of the identifiers;
retrieving from the one or more storage devices a list of devices that are authorized to connect to the network from a virtual local area network (VLAN) connected to the network; and
comparing the identifier of a determined wireless device connected to the network with the list of devices authorized to connect to the network from the VLAN to determine whether the determined wireless device is authorized to connect to the network,
wherein, when any wireless device on the list of devices authorized to connect to the network from the VLAN connected to the network attempts to connect to the network outside the VLAN, determining that said any wireless device is not authorized to connect to the network outside of the VLAN and denying said any wireless device connection to the network outside of the VLAN,
wherein the network connection log includes, for each device connected to the network, network address, name, dynamic host configuration protocol (DHCP) lease expiration time, a unique identifier, and description,
wherein the network connection log is automatically searched to retrieve the identifiers, and wherein retrieval of the list of devices that are authorized to connect to the network from the VLAN connected to the network does not require an attempt to connected to the network by any device of the list of devices that are authorized to connect to the network from the VLAN connected to the network.

2. A method of claim 1, wherein the plurality of criteria specifies information for determining whether a respective identifier corresponds to a known wireless device model name.

3. A method of claim 1, wherein the plurality of criteria specifies information for determining whether the identifier corresponds to a mobile telephone.

4. A method of claim 1, wherein the plurality of criteria specifies information for determining whether a respective identifier corresponds to a wireless network interface controller associated with a known network device.

5. A method of claim 1, wherein the plurality of criteria specifies information for determining whether a respective identifier corresponds to a wireless access point that has been designated as an interfering access point.

6. A method of claim 1, wherein the plurality of criteria specifies information for determining whether a respective identifier corresponds to a wireless device manufacturer.

7. A method of claim 1, further comprising:
adding the device to a list of unauthorized wireless devices based on the comparison.

8. An apparatus comprising:
at least one processor; and
at least one memory including computer program code,
the at least one memory and the computer program code configured to, with the at least one processor, cause the apparatus:
to retrieve identifiers of a plurality of devices connected to a network from a network connection log of devices connected to the network,
to determine whether each of the plurality of devices connected to the network is a wireless device by applying a plurality of criteria to each of the identifiers,
to retrieve a list of devices that are authorized to connect to the network from a virtual local area network (VLAN) connected to the network, and
to compare the identifier of a determined wireless device connected to the network with the list of devices authorized to connect to the network from the VLAN to determine whether the determined wireless device is authorized to connect to the network,
wherein, when any wireless device on the list of devices authorized to connect to the network from the VLAN connected to the network attempts to connect to the network outside the VLAN, determining that said any wireless device is not authorized to connect to the network outside of the VLAN and denying said any wireless device connection to the network outside of the VLAN,
wherein the network connection log includes, for each device connected to the network, network address, name, dynamic host configuration protocol (DHCP) lease expiration time, a unique identifier, and description,
wherein the network connection log is automatically searched to retrieve the identifiers, and
wherein retrieval of the list of devices that are authorized to connect to the network from the VLAN connected to the network does not require an attempt to connected to the network by any device of the list of devices that are authorized to connect to the network from the VLAN connected to the network.

9. An apparatus of claim 8, wherein the plurality of criteria specifies information for determining whether a respective identifier corresponds to a known wireless device model name.

10. An apparatus of claim 8, wherein the plurality of criteria specifies information for determining whether a respective identifier corresponds to a mobile telephone.

11. An apparatus of claim 8, wherein the plurality of criteria specifies information for determining whether a respective identifier corresponds to a wireless network interface controller associated with a known network device.

12. An apparatus of claim 8, wherein the plurality of criteria specifies information for determining whether a respective identifier corresponds to a wireless access point that has been designated as an interfering access point.

13. An apparatus of claim 8, wherein the plurality of criteria specifies information for determining whether a respective identifier corresponds to a wireless device manufacturer.

14. An apparatus of claim 8, wherein the apparatus is further caused to:
add the device to a list of unauthorized wireless devices based on the comparison.

15. A non-transitory computer-readable storage medium carrying one or more sequences of one or more instructions which, when executed by one or more processors, cause an apparatus to at least perform the following steps:
to retrieve from one or more storage devices identifiers of a plurality of devices connected to a network from a network connection log of devices connected to the network,
to determine whether each of the plurality of devices connected to the network is a wireless device by applying a plurality of criteria to each of the identifiers,
to retrieve from the one or more storage devices a list of devices that are authorized to connect to the network from a virtual local area network (VLAN) connected to the network, and
to compare the identifier of a determined wireless device connected to the network with the list of devices authorized to connect to the network from the VLAN to determine whether the determined wireless device is authorized to connect to the network,
wherein, when any wireless device on the list of devices authorized to connect to the network from the VLAN connected to the network attempts to connect to the network outside the VLAN, determining that said any wireless device is not authorized to connect to the network outside of the VLAN and denying said any wireless device connection to the network outside of the VLAN,
wherein the network connection log includes, for each device connected to the network, network address, name, dynamic host configuration protocol (DHCP) lease expiration time, a unique identifier, and description,
wherein the network connection log is automatically searched to retrieve the identifiers, and
wherein retrieval of the list of devices that are authorized to connect to the network from the VLAN connected to the network does not require an attempt to connected to the network by any device of the list of devices that are authorized to connect to the network from the VLAN connected to the network.

16. A non-transitory computer-readable storage medium according to claim 15, wherein the plurality of criteria includes at least information for identifying the determined wireless device based on one or more of wireless device model name, wireless networking capability, wireless network interface controller, a designation as an interfering access point, and device manufacturer.

17. A non-transitory computer-readable storage medium according to claim 15, wherein the apparatus is caused, at least in part, to further communicate with a network address server configured to assign a network address to the wireless device.

\* \* \* \* \*